United States Patent
Chiu et al.

(10) Patent No.: US 11,106,057 B2
(45) Date of Patent: Aug. 31, 2021

(54) TEMPORARY POLAR PATCHES

(71) Applicant: ESSILOR INTERNATIONAL, Charenton-le-Pont (FR)

(72) Inventors: Hao-Wen Chiu, Dallas, TX (US); Haifeng Shan, Dallas, TX (US); Elliot French, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 226 days.

(21) Appl. No.: 16/343,160

(22) PCT Filed: Oct. 19, 2016

(86) PCT No.: PCT/IB2016/001727
§ 371 (c)(1),
(2) Date: Apr. 18, 2019

(87) PCT Pub. No.: WO2018/073619
PCT Pub. Date: Apr. 26, 2018

(65) Prior Publication Data
US 2019/0317338 A1     Oct. 17, 2019

(51) Int. Cl.
*G02C 7/08* (2006.01)
*G02C 7/12* (2006.01)

(52) U.S. Cl.
CPC .............. *G02C 7/086* (2013.01); *G02C 7/12* (2013.01); *G02C 2202/16* (2013.01)

(58) Field of Classification Search
CPC ....... G02C 7/086; G02C 7/12; G02C 2202/16
See application file for complete search history.

(56) References Cited

U.S. PATENT DOCUMENTS

| | | |
|---|---|---|
| 5,764,333 A | 6/1998 | Somsel |
| 2011/0199680 A1 | 8/2011 | Saylor et al. |
| 2013/0194538 A1 | 8/2013 | Junkins |
| 2014/0118681 A1 | 5/2014 | Chiu et al. |
| 2014/0232978 A1 | 8/2014 | Park et al. |
| 2015/0131047 A1* | 5/2015 | Saylor .................. G02B 1/11 351/44 |
| 2017/0102558 A1 | 4/2017 | Saylor et al. |

FOREIGN PATENT DOCUMENTS

| | | |
|---|---|---|
| EP | 1 816 147 A1 | 8/2007 |
| GB | 2495136 A | 4/2013 |
| JP | S60-191204 A | 9/1985 |
| JP | H04-31442 A | 2/1992 |
| JP | 2010-209492 A | 9/2010 |

(Continued)

OTHER PUBLICATIONS

International Search Report and Written Opinion, dated Apr. 28, 2017, from corresponding PCT application No. PCT/IB2016/001727.

(Continued)

*Primary Examiner* — James C. Jones
(74) *Attorney, Agent, or Firm* — Nixon & Vanderhye

(57) ABSTRACT

Optical polymeric sheets with specific ranges of optical retardation, elastic modulus, and Shore A hardness were used to construct flexible polar patches. The polar patches conform to non-polarizing lenses of various diopter bases and provide polarizing efficiency that is comparable to regular polarizing lenses.

11 Claims, 3 Drawing Sheets

(56) References Cited

FOREIGN PATENT DOCUMENTS

| | | |
|---|---|---|
| JP | 2012-173486 A | 9/2012 |
| JP | 2012-173487 A | 9/2012 |
| JP | 2014-071155 A | 4/2014 |
| JP | 2015-072396 A | 4/2015 |
| JP | 2015-075746 A | 4/2015 |
| WO | 2006/054741 A1 | 5/2006 |
| WO | 2013/169987 A1 | 11/2013 |

OTHER PUBLICATIONS

Office Action issued in Chinese Patent Application No. 201680090147.1 dated Jul. 27, 2020 with English translation provided.
Office Action issued in Japanese Patent Application No. 2019-520413 dated Jul. 20, 2020 with English translation provided.
Building Materials (China Electric Power Press, Weidian Huang, Jul. 2007, p. 167) (English relevance discussed in Chinese Office Action).
Office Action issued in Japanese Patent Application No. 2019-520413 dated Mar. 8, 2021.

* cited by examiner

TEMPORARY POLAR PATCHES

FIELD OF THE INVENTION

The invention relates to the fields of ophthalmic lenses and polarizing laminates for ophthalmic lenses.

BACKGROUND

People who wear prescription eyeglasses have limited options for protection from sunlight and glare. Prescription sunglasses are typically more expensive than prescription eyeglasses and require the eyeglass-wearer to carry a second pair of glasses. Photochromic lenses become darker in sunlight, however, these lenses do not provide the glare-blocking functionality of polarized lenses. Clip-on sunglasses provide a detachable sun-blocking cover for eyeglasses, however, this option is deemed unattractive by many consumers.

Eyeglass and sunglass manufacturers have produced frameless sunblocking films for attachment to an eyeglass lens surface. U.S. Patent Publication No. 2014/0232978 discloses optical devices that are reversibly adherent to optical lenses. The devices require a pressure sensitive adhesive to adhere the device to an optical lens. The adhesive can leave a residue on the lens after removal, which attracts dust and other fine particulates. Furthermore, the device adhesion would incrementally diminish after each application and removal. U.S. Patent Publication No. 2014/0118681 discloses a process for making a temporary photochromic patches for ophthalmic lenses. The patch can be trimmed and temporarily applied to an ophthalmic lens without needing adhesive. However, the process of mixing a polydimethylsiloxane and photochromic dye cannot be employed to produce a polarizing patch. U.S. Pat. No. 5,764,333 discloses a method for making sunshields for sunglasses. The method includes the step of cutting a single-layer plastic film into the shape of eyeglass lenses. The materials that may be used to produce the single-layer plastic film are limited, and plastic film optical retardation is not disclosed.

Despite advancements in the area of eyeglass conversion to polarized sunglasses, the currently available options have a number of drawbacks. In order to easily convert eyeglasses into polarized sunglasses, an inexpensive yet attractive approach is needed.

SUMMARY

Disclosed herein are optical polymeric sheets with specific ranges of optical retardation, elastic modulus, and Shore A hardness. The optical polymeric sheets may include a polarizing component and be removably affixed to a non-polarizing lenses in order to impart polarizing functionality. The polar patches are flexible and can conform to eyeglass lenses of various diopter bases and provide polarizing performance that is comparable to traditional polarizing lenses. The flexible polarizing patches may be pre-cut in the shape of a lens or can be cut by the consumer, and applied onto non-polarizing spectacles to temporarily transform them to polarizing eyewear.

The polar patches disclosed herein transform prescription eyeglasses into polarized eyeglasses and provide the same polarizing functionality as a pair of regular polarizing sunglasses. The polar patches have about the same polarizing efficiency and block about the same amount of glare as regular sunglasses. In some embodiments, a polar patch is constructed by sandwiching a polyvinyl alcohol (PVA) polarizing film in-between two transparent polymeric sheets. In some aspects, the polarizing film is aligned with the polarizing axis in the vertical direction and the absorbing axis in the horizontal direction. The PVA polarizing film is responsible for blocking glare, Because glare is typically horizontally-polarized, i.e., perpendicular to the polarizing axis of the film, most glare is absorbed while light polarized parallel to the polarizing axis is transmitted.

It is an object of the disclosure to provide a removable polarizing laminate for reducing through-transmittance of light to a non-polarized optical article. The polarizing laminate provides the wearer with polarizing and glare-blocking functionality not found in photochormic lenses. The polarizing laminate does not require adhesive for attachment to an eyeglass lens. The laminate materials, especially the front side, are selected to avoid optical retardation that changes the polarization state of the incident glare. In some aspects, the front layer of a polar patch laminate is selected to minimize or avoid optical retardation. In some embodiments, the patch involves the use of a polarizing laminate consisting of a polarizing film bonded between two flexible polymeric sheets. The laminate may be cut into the shape of an eyeglass lens and applied onto eyeglasses to provide polarizing functionality. The laminate may be made of polymeric materials having minimum optical retardation, an elastic modulus within a specific range, and Shore A hardness below a certain value to construct polar patches that can conform to lenses of various diopter bases.

In some aspects, a patch for reducing through-transmittance of light to a non-polarized optical article is made of a flat and flexible laminate comprising at least one polarizing film. The patch is releasably securable to a non-polarized optical article, and may be secured to the optical article by a pressure sensitive adhesive (PSA) or by static cling. In embodiments where a pressure-sensitive adhesive is employed, the pressure-sensitive adhesive is located on the lens-contacting side of the patch. In some embodiments, the patch is applied to a lens using water or soapy water.

In some aspects, the polarizing film comprises a polarizing film sheet laminated between a first transparent forward-facing polymeric sheet and a second transparent rear-facing, lens-contacting polymeric sheet. The polarizing film sheet may be a polyvinyl alcohol (PVA) sheet, a PVA-based sheet, polyester (PET), PVA-PVE (Polyvinylene), wire-grid, multilayer reflective polarizing sheet (e.g. 3M Vikuiti™ DBEF Dual Brightness Enhancement Film), or other polarizing film sheets known in the industry. The laminate may include at least one adhesive and/or at least one primer between layers to adhere the layers to each other. The adhesive and/or primer may be selected from adhesives and primers used in the field of laminates. The first and second transparent polymeric sheets may be individually selected from polyvinyl chloride (PVC), thermoplastic polyurethane (TPU), polydimethylsiloxane (PDMS), polyester, or thermoplastic elastomer (TPE). In some embodiments, the transparent forward-facing polymeric sheet comprises an optical retardation of ≤π/5 radian and preferably ≤π/10 radian. In some embodiments, the patch has an elastic modulus of ≤700 Mpa. In some aspects, the patch has a thickness of ≤200 μm. In additional embodiments, the patch has a Shore A hardness of ≤80. In some aspects, the elastic modulus, thickness, and Shore A hardness are selected to confer flexibility to the patch to allow for releasable attachment to a variety of non-polarized optical article shapes.

In some aspects, the patch reduces optical transmission of light polarized in a non-vertical direction. In some embodiments, the patch is the same size and shape of the non-polarized optical article to which it is releasably securable. In some embodiments, the patch may be produced or cut to the same size and shape of an optical article by the manufacturer. In other embodiments, the patch may be cut to the same size and shape of an optical article by a user. In some embodiments, the patch is not the same size and shape of the non-polarized optical article to which it is releasably securable. In some embodiments, the patch has nominal magnifying power.

The Shore A hardness is measured with an apparatus known as a Durometer and consequently is also known as 'Durometer hardness'. The hardness value is determined by the penetration of the Durometer indenter foot into the sample. Because of the resilience of rubbers and plastics, the indentation reading may change over time—so the indentation time is sometimes reported along with the hardness number. The ASTM test method designation is ASTM D2240 00, and related methods include ISO 7619 and ISO 868; DIN 53505; and JIS K 6301, which was discontinued and superseded by JIS K 6253.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of" in one non-limiting aspect, a basic and novel characteristic of the compositions and methods disclosed in this specification includes the patches' abilities to confer polarizing functionality to prescription lenses.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE FIGURES

FIG. 3A is an illustration of a PET film with low tack adhesive on one side and high tack adhesive on the other side. FIG. 3B depicts oval-shaped patches that were cut from polar laminate films.

DETAILED DESCRIPTION

Figure 1:
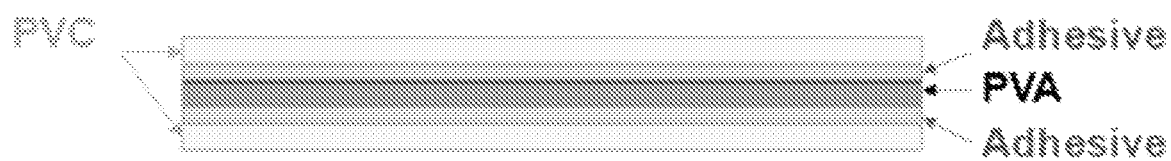
FIG. 1 includes an illustration of one embodiment of a polarizing patch laminate. The laminate comprises a polarizing PVA layer shroud by PVC layers on either side. An adhesive is used to adhere the laminate layers to each other.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The presently disclosed polar patches can be applied onto optical lenses with or without using adhesives and provide polarizing performance that is comparable to traditional sunglasses. In order for the polar patches to provide polarizing efficiency that is comparable to regular polarizing sunglasses, the polymeric sheets, especially the front side, are selected to avoid optical retardation that changes the polarization state of the incident glare. If optical retardation exists in the front polymeric sheet, horizontal glare that is typically blocked by regular polarizing sunglasses may no longer be effectively blocked by a polar patch.

The polar patches disclosed herein are sufficiently flexible to conform to lenses of various diopter bases, typically from near flat to 8-base or even higher. Again, selection of the outer polymeric sheets having the right elastic modulus is important for constructing polar patches having suitable flexibility.

Although not required, it is preferred that polar patches can adhere to lenses of existing eyeglasses without using adhesive. A polar patch that is able to conform to the surface topology of a lens while through a static cling effect is desired. Hence, selecting a backside polymeric sheet with a suitable hardness is very beneficial. In other embodiments, an adhesive may be used to adhere a polar patch to a lens.

The polar patches disclosed herein comprise a PVA polarizing film bonded in-between two polymeric sheets, in some embodiments. To construct a suitable polar patch, the optical retardation, elastic modulus, and hardness of the polymeric sheets are selected to provide polarizing functionality to patch users that is comparable to customary polarizing sunglasses.

In order for a polar patch to achieve glare blocking effects that are comparable to regular polarizing sunglasses, the optical retardation of the front side polymeric sheet, i.e., the side exposing to air when applying onto a lens, should be ≤π/5 radian and preferably ≤π/10 radian. The retardation of a polymeric sheet is defined as $$\Gamma = \frac{2\pi \Delta n L}{\lambda_0}$$

where $\Delta n$ and L are the birefringence and the thickness of the polymeric sheet, respectively. $\lambda_0$ is the vacuum wavelength of incident light. One way to minimize the retardation is to select a polymeric sheet that is low in birefringence. Typically, the birefringence of a polymeric sheet arises from orientation effects from processing. A solvent cast film in general has much lower orientation birefringence than an extruded one. In preferred embodiments, polar patches are constructed using a solvent cast film such a cast polyvinyl chloride (PVC) film or an extruded film of materials of low intrinsic birefringence such as aliphatic thermoplastic polyurethane (TPU).

Further, in order for the polar patches to have sufficient flexibility to conform to lenses of various diopter bases, the elastic modulus of the constituent polymeric sheet should be maintained below a threshold value. In some embodiments, the elastic modulus of the constituent polymeric sheet is ≤700 MPa. In addition, the thickness of the polymeric sheet is selected to enhance its flexibility. In some embodiments, the thickness of the polymeric sheet is ≤200 μm, and preferably ≤100 μm. The Shore A hardness of the polymeric sheet materials is selected to allow the polar patches to be applied onto the lenses of existing eyeglasses without needing adhesive. In some embodiments, the Shore A hardness of the polymeric sheet materials is preferably ≤60.

EXAMPLES

Laminate samples were produced using a nip roll laminator with pressure and gap control.

Example 1

PVC/PVA/PVC Polar Patch

PVC/PVA/PVC polar patches as illustrated in the exemplary embodiment in FIG. 1 were constructed using 53 μm thick PVC layers, 25 μm thick permanent acrylic adhesive layers, a 32 μm thick PVA film as the polarizing layer, and 38 μm thick clear polyester liners as the two outer protective layers (not depicted).

Example 2

TPU/PVA/TPU Polar Patch

Figure 2:
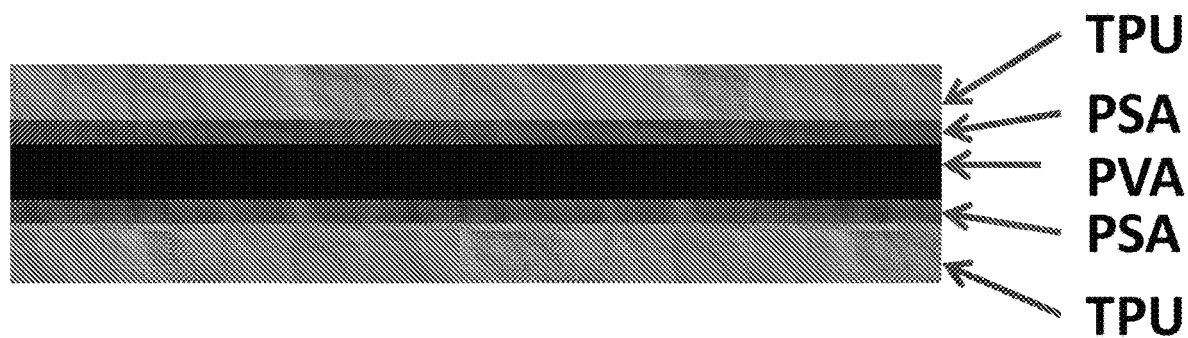
FIG. 2 is an illustration depicting a horizontal cross-section of a TPU/PVA/TPU polar patch embodiment. From top to bottom, the patch laminate layers include a TPU layer, a layer of pressure sensitive adhesive, a polarizing PVA layer, a layer of pressure sensitive adhesive, and a TPU layer.
Figure 3A:
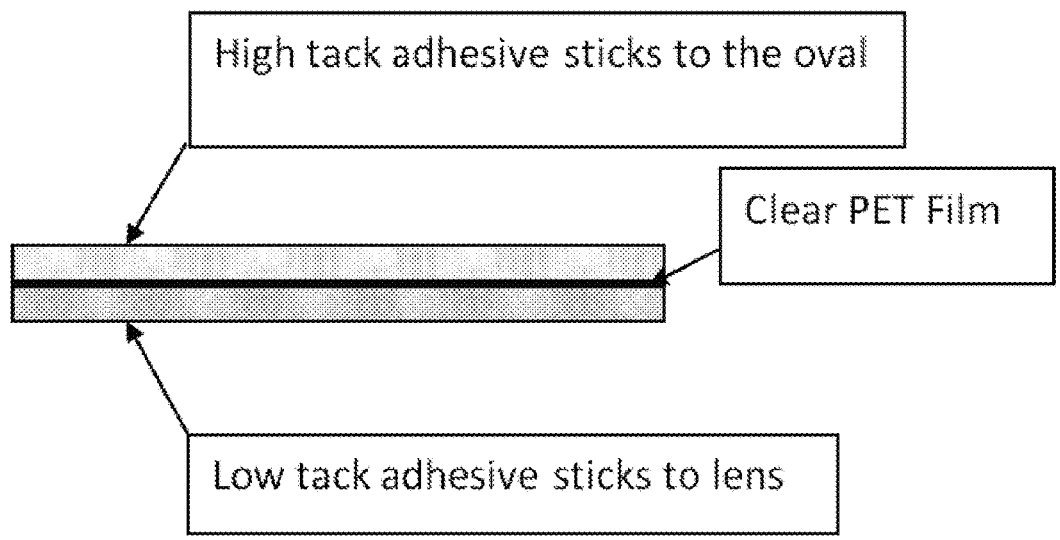
FIGS. 3A-3B depict patch sample preparations for adhesion tests.
Figure 3B:
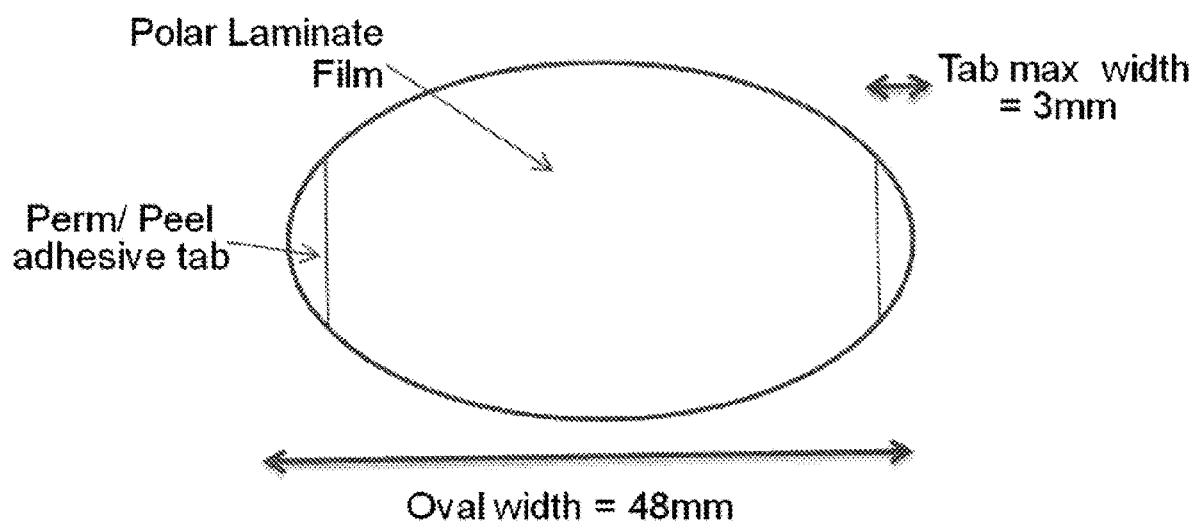

TPU/PVA/TPU polar patches as illustrated in the exemplary embodiment in FIG. 2 were constructed using 150 μm or 50 μm thick TPU films, 40 μm thick PSA layers, and a 32 μm thick PVA polarizing layer.

Example 3

PET/PVA/PET Polar Patch

PET/PVA/PET polar patches were constructed using 25 μm or 127 μm thick PET films, 30-40 μm thick PSA layers, and a 32 μm thick PVA film.

Patch Characterization

Birefringe Tests

Birefringence was tested by viewing an LCD screen through the laminate at various angles and observing for presence of any multicolour birefringence patterns. Birefringence was subsequently tested by applying the ovals to plano eye glasses. The glasses were worn by an observer in sunny outdoor conditions. Presence of multicolour birefringence patterns were observed at various head tilt angles while viewing glare (e.g. a car windshield).

Adhesion Tests

A4 samples of perm/peel double sided transfer adhesive were cut into thin strips. The protective release liner was removed from the higher tack side of the transfer adhesive. The adhesive strips were subsequently applied by hand to fixed tint polarized laminate film samples. The oval shapes were then cut from the film using a hand operated cutting press. The adhesive strips were applied in a configuration so that the maximum coverage of the oval peripheries measured 3 mm from the edge of the oval.

The oval adhesion was monitored by applying an oval to a convex sample lens and measuring delamination time.

PVC/PVA/PVC Polar Patch Results

As the PVC film is non-birefringent (therefore does not impose any optical retardation) and optically clear, the resulting PVC/PVA/PVC polar patches retain the same polarization efficiency as the PVA polar film alone. The PVC films have an elastic modulus of about 500 MPa, and are therefore flexible and soft. The patches were applied onto the front surfaces of low base lenses with soapy water. Higher power lenses with greater surface curvature may necessitate the use of a PSA.

The 53 μm thick PVC used to construct the PVC/PVA/PVC polar patch was rigid, and those patches did not conform to high base lenses. Thinner PVC films, e.g., 33 μm thick PVC films, alleviated this issue. The polar patches exhibited high polarizing efficiency, and almost completely blocked light in cross polar position.

TPU/PVA/TPU Polar Patch Results

Similar to PVC films, TPU films have no birefringence and high clarity. The resulting polar patches did not show any visible birefringence, and good adhesion and high polarization efficiency was observed on all tested lens types. The patches can be applied onto the front surfaces of low base lenses without adhesive. Using a PSA, the patches can stick and conform to 7 and 8 base lenses without issues. The TPU polar patches exhibited high polarization efficiency, and almost completely blocked light in cross polar position.

PET/PVA/PET Polar Patch Results

Good polarization efficiency was observed when the forward PET layer's (facing the incident light) principal axes were aligned with PVA's polar axis. Poor alignment of PET's principal birefringence axes decreased polarization efficiency. The PET film is rigid, and the resulting polar patches did not conform to some low base lenses without using adhesive.

Based on the results, the TPU and clear PVC films were determined to be the most suitable outer layer materials for the polar patch applications.

The claims are not to be interpreted as including means-plus- or step-plus-function limitations, unless such a limitation is explicitly recited in a given claim using the phrase(s) "means for" or "step for," respectively.

The invention claimed is:

1. A patch for reducing through-transmittance of light to a non-polarized optical article, comprising:
   a flat and flexible laminate comprising at least one polarizing film;
   wherein the patch is releasably securable to the non-polarized optical article, and
   wherein the patch has an elastic modulus of ≤700 MPa, a thickness of ≤200 μm, and a Shore A hardness ≤80.

2. The patch of claim 1, wherein the polarizing film comprises a polarizing film sheet laminated between a first transparent forward-facing polymeric sheet, and a second transparent rear-facing, lens-contacting polymeric sheet.

3. The patch of claim 1, wherein the polarizing film sheet is a PVA based sheet.

4. The patch of claim 2, wherein the first and second transparent polymeric sheets are individually selected from PVC, TPU, or PDMS (Polydimethylsiloxane).

5. The patch of claim 4, wherein the transparent forward-facing polymeric sheet comprises an optical retardation of ≤π/5 radian and preferably ≤π/10 radian.

6. The patch of claim 1, wherein the patch is releasably securable to a non-polarized optical article by static cling.

7. The patch of claim 1, wherein the patch is releasably securable to a non-polarized optical article with a pressure-sensitive adhesive.

8. The patch of claim 7, wherein the pressure-sensitive adhesive is located on a lens-contacting side.

9. The patch of claim 1, wherein the patch reduces optical transmission of light polarized in a non-vertical direction.

10. The patch of claim 1, wherein the patch is the same size and shape of the non-polarized optical article to which it is releasably securable.

11. The patch of claim 1, wherein the patch is not the same size and shape of the non-polarized optical article to which it is releasably securable.

* * * * *